United States Patent [19]

Arai et al.

[11] 4,211,482

[45] Jul. 8, 1980

[54] ELECTROPHOTOGRAPHIC COPYING APPARATUS EQUIPPED WITH SCANNING SYSTEM CONTROL DEVICE

[75] Inventors: Kenichi Arai, Nakano; Kenji Shibazaki, Aichi; Tsuneo Kitagawa, Toyohashi; Tomoji Murata, Toyokawa; Kenzo Nagata, Okazaki, all of Japan

[73] Assignee: Minolta Camera Kabushiki Kaisha, Osaka, Japan

[21] Appl. No.: 22,363

[22] Filed: Mar. 20, 1979

[30] Foreign Application Priority Data

Apr. 5, 1978 [JP] Japan ................................. 53-40735

[51] Int. Cl.² ........................................... G03G 15/28
[52] U.S. Cl. ..................................... 355/8; 355/14 C; 355/57; 355/60
[58] Field of Search ....................... 355/8, 14 C, 55–60

[56] References Cited

U.S. PATENT DOCUMENTS

| | | | |
|---|---|---|---|
| 4,032,231 | 6/1977 | Zucker | 355/60 |
| 4,080,062 | 3/1978 | Torigai et al. | 355/57 X |
| 4,093,374 | 6/1978 | Zucker et al. | 355/57 |
| 4,095,880 | 6/1978 | Shogren et al. | 355/8 |
| 4,120,578 | 10/1978 | Daniels et al. | 355/57 X |

*Primary Examiner*—R. L. Moses
*Attorney, Agent, or Firm*—Wenderoth, Lind & Ponack

[57] ABSTRACT

A copying apparatus which is equipped with a scanning system control device including means for judging sizes of copy paper sheets employed, means for detecting copying magnifications, and means for controlling movement of the scanning system of the copying apparatus so as to correspond to the area available for copying or copying coverage to be determined by the judged size and detected copying magnification. The movement of the scanning system is not controlled by the size of the original or copy paper sheet itself, but is regulated to correspond to the area available for the copying on an original platform to be determined by the copy paper size and copying magnification.

6 Claims, 9 Drawing Figures

ELECTROPHOTOGRAPHIC COPYING APPARATUS EQUIPPED WITH SCANNING SYSTEM CONTROL DEVICE

BACKGROUND OF THE INVENTION

The present invention relates to an electrophotographic copying apparatus and more particularly, to an electrophotographic copying apparatus equipped with an improved scanning system control device which is arranged to control movement of the scanning system according to copy paper sizes or copying magnifications.

Commonly, in electrophotographic copying apparatuses of slit exposure type, it is so arranged that, while a photosensitive member or photoreceptor is moved at a predetermined speed, an optical system is also moved in synchronization therewith at a specific speed determined by the moving speed of the photoreceptor and copying magnification so as to optically scan an original to be copied for sequentially projecting light-wise images of the original onto the photoreceptor. It is to be noted that the "optical system" referred to hereinbelow means a fixed or stationary optical system associated with a movable original platform on which an original to be copied is placed in the case of a copying apparatus of movable original platform type, and a movable optical system including a light source, reflecting mirrors, etc. and moving under the lower surface of a fixed original platform in the case of a copying apparatus of movable optical system type.

In the copying apparatus of the latter type, i.e., of the movable optical system type as described above, if the moving distance of the optical system is arranged to be approximately equal to the length of the original to be scanned or that of the copy paper to be used so as to return the optical system immediately after completion of scanning, it is extremely advantageous from the viewpoint of practical use, since time and movement unnecessary for the copying operation are eliminated with consequent increase of the copying speed.

Conventionally, there has been proposed an arrangement as described above in which copy paper in the form of a roll is employed, with switch means or switch actuating member being arranged to be moved for cutting off the copy paper from the roll according to the length of the original to be copied, for example, in U.S. Pat. No. 3,751,158 wherein switch means for cutting the copy paper in the roll form and switch means for returning the optical system are movably disposed along the moving path of the scanning system, so that an operator actuates the switch means for cutting the copy paper into the length corresponding to the original, and also for returning the optical system.

However, for copying apparatuses in which copy paper sheets preliminarily cut into a predetermined length are employed, the known arrangement as described above in which the moving distance of the scanning system is controlled by the provision of the switch means and the like movable according to the length of the original, imposes, on the contrary, troublesome procedures on the part of the user, and moreover, is not preferable for the practical purpose, since the length of the copy paper does not necessarily correspond to that of the original. Accordingly, for the copying apparatuses employing cut copy paper sheets of predetermined size, there has been conventionally proposed an arrangement wherein the moving distance of the scanning system is preliminarily determined according to the kind of copy paper sheet employed, with switch means for returning purpose being disposed at a predetermined moving position so as to vary the moving distance of the scanning system through selective actuation of the switch means according to the sizes of the copy paper sheets, for example, in Japanese Laid Open Patent Application Tokkaisho No. 50/99152. The known arrangement as described above, however, still has disadvantages in that, if many kinds of copy paper sheets are employed, extremely complicated circuit constructions are inevitably involved in copy paper size selecting means and selecting means for the optical system returning switch, and the controlling is limited to two or three kinds of copy paper sheets at most, thus not being suitable for the practical purpose.

On the other hand, if the copying magnification varies with respect to the copy paper sheets of equal size, copying coverage i.e. area available for copying or area to be covered by copying on the original platform is altered. For example, when a reduced size copying or contraction is to be effected, the copying coverage becomes larger than the size of the copy paper sheet, while in an enlarge scale magnification copying or enlargement, the copying coverage becomes smaller than the size of the copy paper sheet. In other words, when the copy paper size and copying magnification are determined, the copying coverage or area available for the copying on the original platform is also determined, and if the scanning system as described above is moved at least by the amount equivalent to the area to be covered by the copying, the scanning movement suitable for the copy paper sheet size can be effected. However, it is not possible to effect controlling of the scanning system based on the conception as described above by switch means actuated merely through movement of the scanning system, and furthermore, even if the above control is intended to be achieved by setting of timer means, an extremely large number of timers are required or time set by the timers is not sufficiently accurate, and thus, almost no attention has been directed so far to the control of movement of the scanning system by the copy paper sizes and copying magnifications.

SUMMARY OF THE INVENTION

Accordingly, an essential object of the present invention is to provide an electrophotographic copying apparatus equipped with an improved scanning system control device which is arranged to control movement of the scanning system according to copy paper sizes and copying magnifications especially through utilization of timer function, and various other functions for memorizing, judging, etc. of a micro-computer and the like.

Another important object of the present invention is to provide an electrophotographic copying apparatus equipped with an improved scanning system control device which is capable of extremely precisely controlling the movement of the scanning system in correspondence with the area to be covered by the copying determined by the copy paper sizes and copying magnifications so as to prevent the scanning system from moving unnecessarily, and in which the control as described above is automatically effected without any complication of the circuit construction even in a copying apparatus able to selectively use many copy paper sizes and copying magnifications.

A further object of the present invention is to provide an electrophotographic copying apparatus equipped with an improved scanning system control device of the above described type which is accurate and stable in functioning with a high reliability, and can be manufactured at low cost.

In accomplishing these and other objects according to one preferred embodiment of the present invention, in an electrophotographic copying apparatus which includes an original platform of transparent plate material, an optical system having a light source for illuminating an original to be copied from under surface of said original platform and reflecting mirrors and lens assembly for directing light-wise image of the original illuminated by said light source onto a photoreceptor, an original scanning system including means for relatively moving said optical system and said original platform, means for selecting copying magnifications at least including mechanism for varying moving speed of said original scanning means, copy paper loading section capable of loading thereon copy paper of at least more than two different sizes, and control device for controlling scanning movement at least of said original scanning means, the control device further comprises means for detecting the copying magnification selected by said copying magnification selecting means, means for detecting size of the copy paper loaded on said copy paper loading section, means for setting time required for said scanning means to move over area available for the copying at the moving speed to be determined by said copying magnification, so as to correspond to the area available for the copying on said original platform to be determined by the detected magnification and copy paper size, means for starting the scanning movement of said scanning means at predetermined speed to be determined by said copying magnification, means for measuring time started to function following starting of the scanning of said scanning means, means for comparing the time measured by said time measuring means with the time preliminarily set by said time setting means, and means for emitting signal to stop the scanning movement of said scanning means when said measured time becomes equal to said set time as a result of the comparison by said comparing means.

For the control means as described above, a micro-computer is employed for utilizing timer function and various other functions for memorizing, judging, etc. thereof so as to control the movement of the scanning system according to copy paper sizes and copying magnifications. By the arrangement of the present invention as described above, the movement of the scanning system is advantageously controlled to correspond to the area available for the copying on the original platform to be determined by the copy paper size and copying magnification, without imposing any troublesome procedures on the part of the users, with substantial elimination of disadvantages inherent in the conventional arrangements of the kind.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
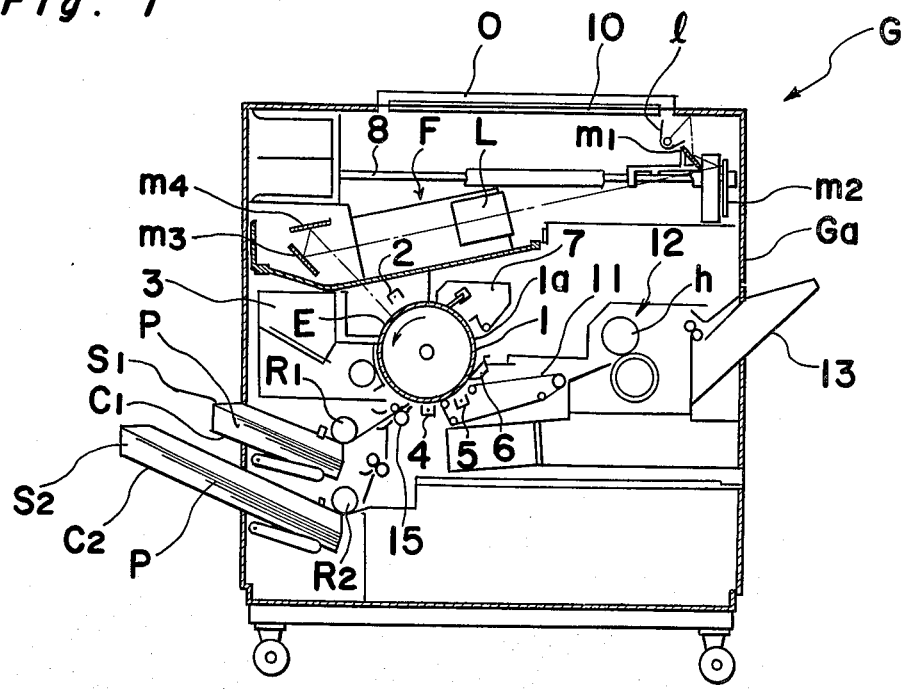
FIG. 1 is a schematic side sectional view of an electrophotographic copying apparatus in which a scanning system control device according to the present invention is incorporated.

In the first place, it is to be noted that, although the technical subject and objects, etc. of the present invention are fully disclosed in the present specification, the present invention is also based on the concept as described hereinbelow. That is to say, the present invention is intended for application mainly to a slit exposure type electrophotographic copying apparatus employing a micro-computer for controlling its functions and capable of selectively using copy paper sheets of a plurality of different sizes at varying magnifications.

More specifically, function control of a copying apparatus by the micro-computer is of the program control, and therefore, various timing signals are emitted through time control. The arrangement as described above may also be applied to the control of the scanning means, but when the scanning means is intended to be controlled through the time control, time width thereof must be set to be variable according to the copying magnifications, since the scanning speed varies with the variation of the copying magnification even for the same moving distance. Moreover, the control time width varies with the variation of the copy paper sheet employed.

As is seen from the above description, it is extremely troublesome and complicated to subject the scanning movement of the scanning means to the time control, and as a matter of fact, such time control can not be satisfactorily achieved by the employment of an ordinary LC timer means.

Accordingly, it becomes very significant to employ the micro-computer for the time control as in the present invention, which is achieved only when the timer function for returning the scanning means upon coincidence with the predetermined member of pulses, program or memory function capable of designating any number of addresses, etc. of the micro-computer are utilized.

As described in the foregoing, the present invention utilizes the time control by the micro-computer for the control of movement of the scanning means, and has novel and progressive features over the conventional arrangements in that signals obtained based on the copy paper sizes and copying magnifications are used for the setting of the controlling time width to achieve the scanning movement by the distance corresponding to the copying coverage or area to be covered by the copying. It is to be noted that, although the scanning movement corresponding to the copying coverage is a method with the smallest wasteful movement as considered on the basis of a copy paper sheet of fixed size, there may be a possibility of unnecessary or insufficient scanning movement when considered on the basis of an original to be copied. This may be clear upon comparison of the scanning of a copying apparatus of random cut and random return type using copy paper in a roll form, with that of the present invention in the case where the original is somewhat larger or smaller than the fixed size. More specifically, in the random cut type, scanning movement with the least loss is achieved through scanning by the length of the original with no waste of copy paper. However, since the employment of the copy paper in the roll form has numerous other drawbacks of its own, the present invention is mainly applied to the copying apparatus utilizing cut copy paper sheets.

Referring now to the drawings, there is shown in FIG. 1 an electrophotographic copying apparatus to which the scanning system control device directly related to the present invention may be applied.

In FIG. 1, the copying apparatus G generally includes an apparatus housing Ga of rectangular box-like configuration defined by walls, and a photosensitive member or photoreceptor drum 1 of known construction having a photoconductive photoreceptor surface 1a provided on the outer periphery thereof and rotatably disposed at approximately the central portion of the housing Ga for rotation in the direction of the arrow to cause the photoreceptor surface 1a to sequentially pass various processing stations disposed therearound for image formation, such as a charging station with a corona charger 2, an exposure station E, a developing station having a developing device 3, a transfer station having a transfer charger 4, a charge erasing station provided with an AC discharger 5, a copy paper sheet separating station with a separating claw 6, a cleaning station having a cleaning unit 7, etc. As the photoreceptor drum 1 rotates, the surface 1a thereof is uniformly charged by the corona charger 2, and light-wise image of an original O obtained through scanning of the original O by a scanning system F mentioned later is projected onto the photoreceptor surface 1a at the exposure station E to form thereon an electrostatic latent image of the original O, which is then developed into a visible toner image by the developing device 3 for being subsequently transferred by the transfer charger 4 onto a copy paper sheet P transported in synchronization with the proceeding of the development, and thereafter the copy paper sheet P bearing the visible toner image thus transferred thereon is separated from the photoreceptor surface 1a by means of the AC discharger 5, separating claw 6, etc. so as to be further transported, through a transportation belt 11 movably supported by a plurality of rollers in a position subsequent to the transfer charger 4, to a fixing device 12 including a heat roller h for fixing the visible toner image onto the copy paper sheet P by heating, and then, the copy paper sheet bearing the copied image is discharged onto a tray 13, while residual toner remaining on the surface 1a of the photoreceptor drum 1 continuously rotating is scraped off the surface 1a by the cleaning unit 7 for completion of one copying cycle.

At the upper portion of the housing Ga, there is fixedly provided a platform 10 of light transmitting transparent material for placing the original O to be copied thereon, while below and adjacent to the platform 10, the scanning optical system F including a movable exposure lamp l, first and second reflecting mirrors m1 and m2 and a lens assembly L, and also fixed reflecting mirrors m3 and m4 is disposed. The exposure lamp l, first and second reflecting mirrors m1 and m2, etc., are arranged to be moved along rail member 8 by a driving mechanism mentioned later for optically scanning the original O mounted on the original platform 10.

For making it possible to simultaneously stock, for example, two different sizes of copy paper sheets P, the copying apparatus G is provided, at the lower left portion of the housing Ga, with upper and lower cassette loading sections $S_1$ and $S_2$ respectively loaded with copy paper sheet containers or cassettes $C_1$ and $C_2$ in which stacks of the copy paper sheets P of different sizes are accommodated, and by selectively operating copy paper sheet feeding rollers $R_1$ and $R_2$ adapted to contact the leading edges of the copy paper sheets P and provided in positions corresponding to the cassettes $C_1$ and $C_2$ through suitable means (not shown), either one of the copy paper sheets P contained in the cassette $C_1$ or $C_2$ is fed one by one from the top of the stack of the copy paper sheets P toward the transfer station through corresponding guide plates and feeding rollers. The synchronization between the copy paper sheet P to be transported in the above described manner and the electrostatic latent image to be formed on the photoreceptor surface 1a of the photoreceptor drum 1 is effected by controlling the driving of transportation rollers 15 provided prior to the transfer charger 4 through timer means operated by signals from switch means actuated at predetermined positions following the scanning movement of the scanning system F (mentioned more in detail later). In the above arrangement, copy paper sheets, for example, of A3, B4, A4, B5, A5, B6 sizes, etc. may be employed for the size exchange by cassette replacement, and selected sizes are judged by a mechanism to be mentioned later.

It is to be noted here that expressions such as A row and B row employed throughout the present specification for denoting paper sizes are based on Japanese Industrial Standards (JIS), in which the paper sizes are represented both for the A row and B row in the order from larger size to smaller size in such a manner as A0 (A zero), A1, A2, . . . , A12, and B0 (B zero), B1, B2, . . ., B12, etc. Specific paper sizes for respective symbols are given in Table 1 below.

Table 1

| Finished dimensions by JIS standards | | | |
|---|---|---|---|
| A row No. | Unit (mm) | B row No. | Unit (mm) |
| 0 | 841 × 1189 | 0 | 1030 × 1456 |
| 1 | 594 × 841 | 1 | 728 × 1030 |

Table 1-continued

| A row No. | Finished dimensions by JIS standards Unit (mm) | B row No. | Unit (mm) |
|---|---|---|---|
| 2 | 420 × 594 | 2 | 515 × 728 |
| 3 | 297 × 420 | 3 | 364 × 515 |
| 4 | 210 × 297 | 4 | 257 × 364 |
| 5 | 148 × 210 | 5 | 182 × 257 |
| 6 | 105 × 148 | 6 | 128 × 182 |
| 7 | 74 × 105 | 7 | 91 × 128 |
| 8 | 52 × 74 | 8 | 64 × 91 |
| 9 | 37 × 52 | 9 | 45 × 64 |
| 10 | 26 × 37 | 10 | 32 × 45 |
| 11 | 18 × 26 | 11 | 22 × 32 |
| 12 | 13 × 18 | 12 | 16 × 22 |

Figure 2:
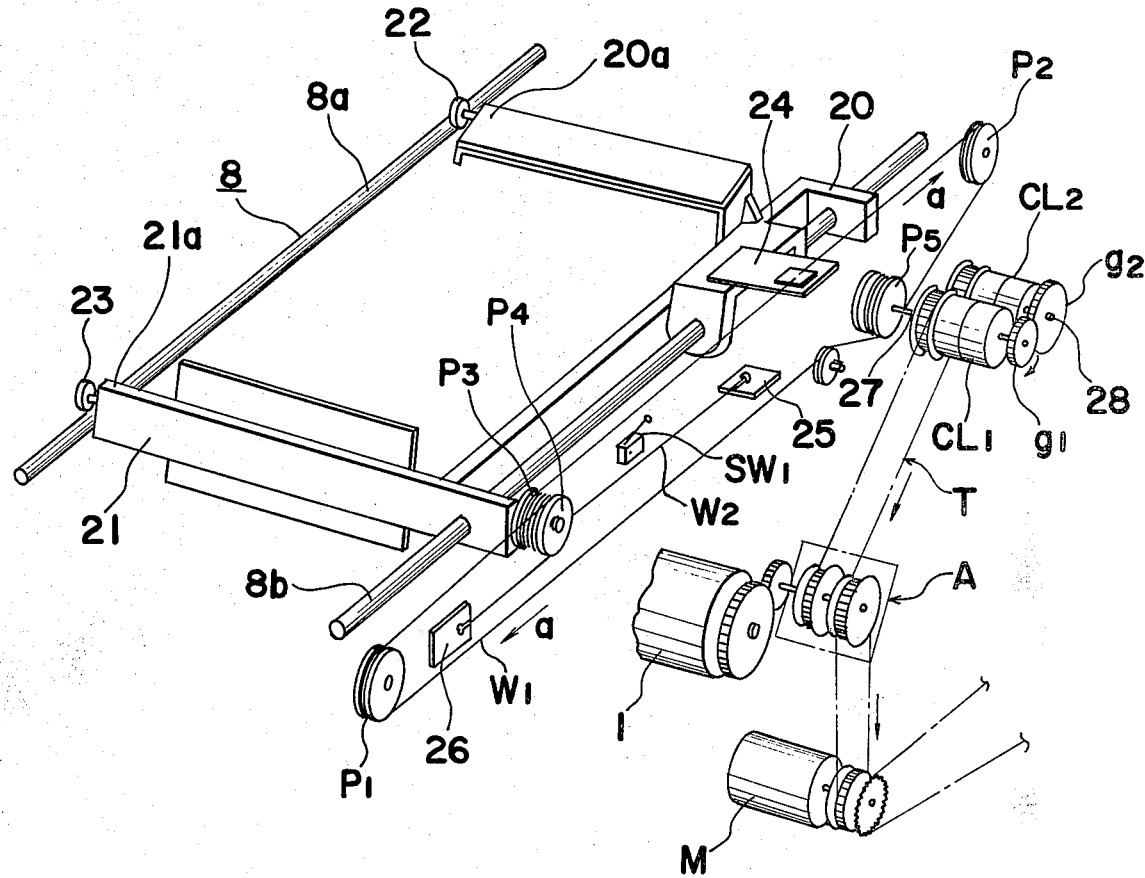
FIG. 2 is a perspective view showing, on an enlarged scale, a construction of a scanning system driving mechanism employed in the copying apparatus of FIG. 1.

Referring to FIG. 2, there is schematically shown the scanning system driving mechanism, in which the rail member 8 mentioned above includes rails 8a and 8b arranged in spaced and parallel relation with each other. On the rail 8b a support member 20 for the first reflecting mirror m1 and another support member 21 for the second reflecting mirror m2 are slidably mounted each at one end thereof, while the other ends 20a and 21a of the support members 20 and 21 are supported on the rail 8a through corresponding wheels 22 and 23 rotatably provided on said ends 20a and 21a. Wires $W_1$ and $W_2$ are passed around pulleys $P_1$ and $P_2$ rotatably provided on frames (not shown) of the apparatus housing Ga, pulleys $P_3$, $P_4$, etc. also rotatably mounted on the support member 21 and a pulley $P_5$ secured to one end of a driving shaft 27, while respective ends of the wires $W_1$ and $W_2$ are secured to a fixing piece 24 extending outwardly from the support member 20, and fixing pieces 25 and 26 secured to frames (not shown) of the apparatus housing Ga for moving the support members 20 and 21 in a manner as described later upon rotation of the pulley $P_5$.

The driving shaft 27 is provided with a transmission mechanism T including a scan clutch $CL_1$, a return clutch $CL_2$, a chain and sprocket or a timing belt and pulley arrangement and the like, and a gear g1 secured to the other end of the shaft 27 engages a gear g2 fixed on the same shaft 28 for a return clutch $CL_2$. When the scan clutch $CL_1$ is energized or turned ON, the return clutch $CL_2$ is deenergized or turned OFF and the rotational force through the transmission mechanism is transmitted to the driving shaft 27 via the scan clutch $CL_1$. Meanwhile, upon receipt of a signal for stopping or returning of the scanning system mentioned later, the scan clutch $CL_1$ is turned OFF, while the return clutch $CL_2$ is turned ON, and the driving shaft 27 is driven in a direction opposite to that during the scanning through the return clutch $CL_2$, and gears g2 and g1. The transmission mechanism T is so arranged as to transmit the driving force of a motor M to the photoreceptor drum 1 and also to the clutch mechanism as described in the foregoing. For varying the scanning speed of the scanning system F, with variable copying magnifications, a speed change mechanism including a combination of gears, clutches, etc. is provided, for example, in a position A indicated in FIG. 2, and simultaneously the lens assembly L is moved along its optical axis by a lens assembly moving mechanism mentioned later.

It is to be noted here that the returning of the scanning system F described as effected through the functioning of the return clutch $CL_2$ in the foregoing may be modified to be effected by restoring force of a spring (not shown) biased during the scanning movement. In the above case, it is so arranged that the driving shaft 27 is released from the transmission mechanism T upon turning OFF of the scan clutch $CL_1$.

In the above arrangement, the driving of the scanning system F is effected in such a manner that, upon turning ON of the scan clutch $CL_1$, the pulley $P_5$ on the driving shaft 27 is rotated for moving the wire $W_1$ in the direction of an arrow a in FIG. 2, and thus, the support member 20 pulled in the same direction moves on the rail member 8 at a speed of V, which is equal to the speed of rotation of the photoreceptor drum 1 and transportation speed of the copy paper sheet P during the equal size copying at a magnification of 1:1, while the scanning speed is arranged to be V/M during the copying magnification of M through proper setting of gear ratio and the like. Following the movement of the support member 20, the support member 21 also moves toward the right in FIG. 2 at a speed of V/2M through rotation of the pulley $P_3$ thereof.

Upon receipt of the scanning movement stopping or returning signal from a control means mentioned later, the scan clutch $CL_1$ is turned OFF, with the return clutch $CL_2$ turned ON, and the driving shaft 27 is rotated in the opposite direction as described earlier through gears g1 and g2 for returning the support members 20 and 21 to the original position.

Figure 3:
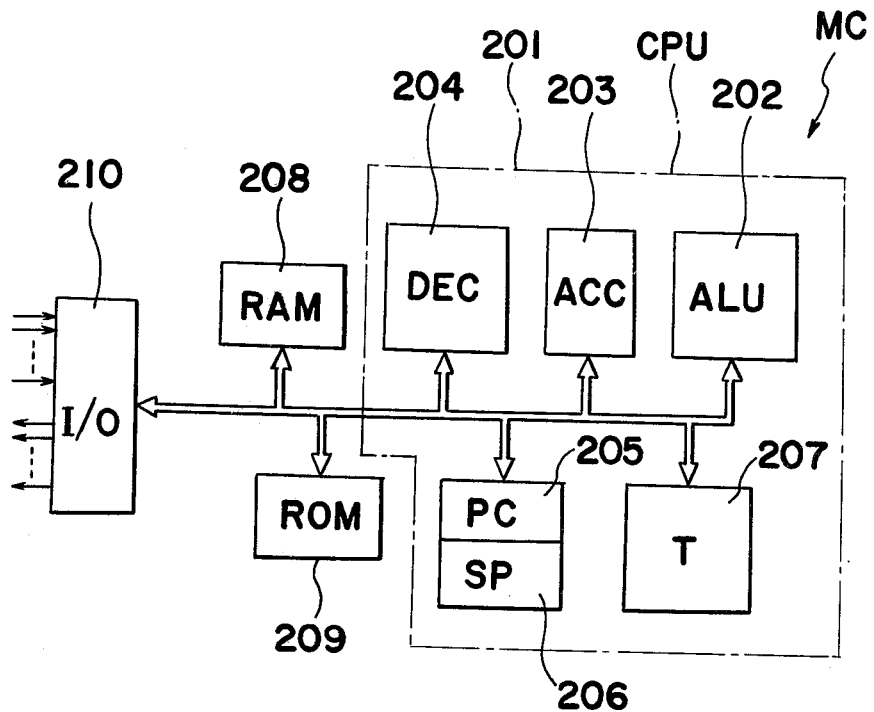
FIG. 3 is an electrical block diagram showing a construction of a micro-computer employed in the copying apparatus of FIG. 1 for sequence control of operations such as control of movement of the scanning system.

Referring to FIG. 3, a digital control device to be used for sequence control such as control of movement of the scanning system, etc. as stated in the foregoing will be described hereinbelow, with a microcomputer MC taken up as one example thereof.

The micro-computer MC of FIG. 3 fundamentally includes a central processing unit (CPU) 201 in which an arithmetic and logic unit (ALU) 202, registers such as an accumulator (ACC) 203, a control and instruction decoder (DEC) 204, a program counter (PC) 205 and a stack pointer (SP) 206, and a timer (T) 207 and the like are incorporated, and memory means composed of semiconductor memory cell such as random access memory (RAM) 208 and read only memory (ROM) 209, etc., for receiving signals from external circuits and also for emitting control signals therefrom through an input/output interface (I/O) 210 in a known manner. In the central processing unit (CPU) 201, there are further incorporated several kinds of flags (F), registers, etc. (not shown) for generating control signals from the input/output interface (I/O) 210 according to external information or the program within the read only memory (ROM) 209 during transmission of data among the central processing unit (CPU) 201, input/output interface (I/O) 210, and random a access memory (RAM) 208, etc. For synchronization of functioning of the central processing unit (CPU) 201, etc., the micro-computer MC further includes a clock generator (not shown) which utilizes a crystal oscillator and the like whose oscillation is subjected to proper frequency division for supplying control clock signal of two phases to the central processing unit (CPU), etc. The micro-computer MC functions based on the above clock signal, while the timer (T) 207 functions to further subject the clock signal to frequency division. The timer (T) 207 which is arranged to produce fundamental control pulses for sequence control of the mechanisms of the copying apparatus G as described in the foregoing will be referred to as a reference timer (T) hereinbelow, the construction of which is schematically shown in FIG. 4.

Figure 4:
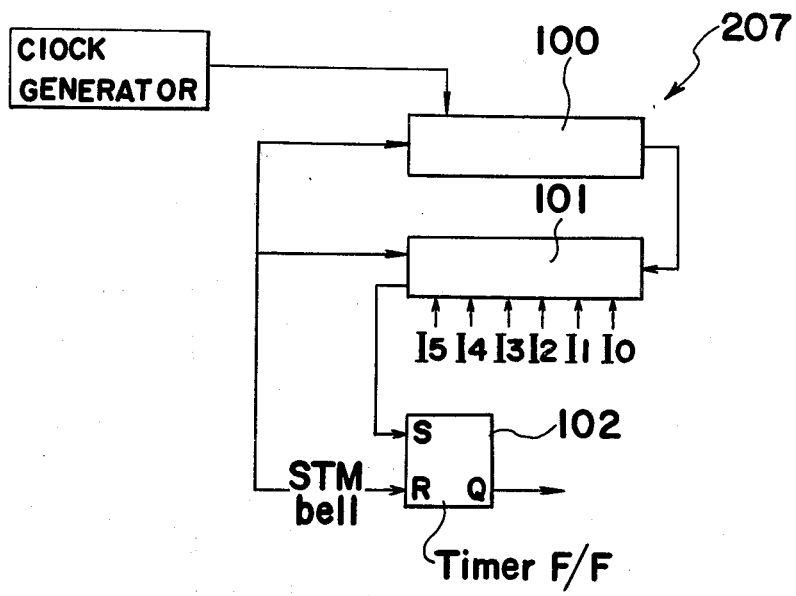
FIG. 4 is a schematic diagram showing the construction of the timer employed in the arrangement of FIG. 3.

In FIG. 4, the reference timer (T) 207 includes, for example, a six bit polynominal counter 100, a programmable binary counter 101, and a timer flip-flop (F/F) 102. The clock signal described earlier is counted by the polynominal counter 100, and upon counting up, one pulse is applied to the programmable binary counter 101. For example, when the clock signal is of 400 KHz, one cycle is 10 μsec, and the polynominal counter 100 is to count up per each 630 μsec. (63×10). The programmable binary counter 101 in which predetermined numbers are preliminarily set is arranged to count down every time the signal from the polynominal counter 100 is received, and also to count down by the signal after the state $\phi\phi\phi\phi\phi\phi$ has been reached to generate "borrow" for setting the timer flip-flop (F/F) 102. Although the counting of the reference timer (T) 207 is terminated by the above step, starting of counting is effected by a timer setting insturction STM, by which the polynominal counter 100 and timer flip-flop 120 are re-set, with simultaneous setting of contents of the immediate data portion six bits $I_5$ to $I_0$ in the programmable binary counter 101 for preliminarily input of set values for the reference timer (T) 207.

The sequence control, etc. of the copying apparatus is effected by counting the pulse of the reference timer (T) 207, and the timer employed for the scanning system control device according to the present invention is fundamentally a counter for counting the pulses of the reference timer (T) 207, in which the detection signals from a copy paper size judging means and a copying magnification detecting device mentioned later are stored in the random access memory (RAM), the contents of which are judged to designate the address of the program for comparison with the values stored in the read only memory (ROM) so as to effect driving control of the scanning system.

The control of the scanning system by the above timer setting will be described hereinbelow with reference to a flow-chart of FIG. 5.

Upon application of power supply to the copying apparatus G of FIG. 1, power source (not shown) for operating the micro-computer MC as described in the foregoing is also turned ON to start controlling. From the starting signal section, judgement of the state of copying function is first effected at a step ①. In other words, it is detected at the step ① whether a print switch (not shown) is turned ON or not, and if YES, a timer TIM-1 (not shown) for delaying is actuated at a step ② so as to provide a sufficient time necessary for rising of the exposure lamp l during the period from turning ON of the print switch to actuation of the scanning system driving mechanism. It is to be noted that the timer TIM-1 has a structure similar to that of the programmable binary counter 101 mentioned earlier. At a step ③ termination of the functioning of the timer TIM-1 is judged, and if YES, judgement of the copy paper size is effected at the subsequent step ④ by applying a signal from a copy paper size judging means mentioned later through the interface (I/O) 210. In a step ⑤ based on the signal from a copying magnification detection means mentioned later, predetermined number of pulses is individually set simultaneously with the above judgement of the copy paper size based on the signal from the copying magnification detection means mentioned later. For the setting of the pulse numbers as described above, the copy paper size judging signal and copying magnification detection signal are applied into the random access memory (RAM) 208 through the interface (I/O) 210, and based on the judgement of the contents of the random access memory (RAM) 208, addresses of the program memorized in the read only memory (ROM) 209 are designated for utilizing the data preliminarily set in the program for the setting.

Subsequently, in a step ⑥ based on the copying magnification detection signal, signal for turning ON the scan clutch $CL_1$ (FIG. 2) of the scanning system driving mechanism mentioned earlier including the copying speed designation is emitted (note that the motor M has started driving upon turning ON of the print switch), and the scanning system starts the scanning movement at a predetermined speed. In a step ⑦ it is judged whether a switch $SW_1$ (FIG. 2) to be actuated at the predetermined position of the moving scanning system is turned ON or not. The switch $SW_1$ is, for example, a microswitch to be actuated upon contact with the support member 20 as shown in FIG. 2, and is provided in a position close to the scanning starting position. Upon turning ON of the switch $SW_1$, a step ⑧ is entered for setting the pulse number count flag to "1". The above flag is preliminarily designated with predetermined bits for predetermined area of the random access memory (RAM) 208.

In a step ⑨ the pulse number count flag as described above is judged, and if it is "1", a subsequent step ⑩ is entered to add "1" to the contents of the counter, which designates the random access memory (RAM) area apart from the random access memory (RAM) area of the step ⑤ and counts up the contents thereof "1" by "1" at each one pulse of the reference timber (T) described above.

In the next step ⑪, values preliminarily included in the program designated by the contents stored in the random access memory (RAM) 208 in correspondence to the copy paper size and copying magnification set at the above step ⑤ are compared with the contents of the random access memory (RAM) 208 for counting, and if they are equal to each other, a step ⑫ is entered, while if not, the step is skipped over to ⑬. As comparing means, for example, the contents of the random access memory (RAM) 208 for the counting are loaded on the accumulator (ACC) 203 for utilizing insturction comparing the contents of the accumulator (ACC) and those of the designated random access memory (RAM) 208.

As a result of the comparison at the step ⑪, if the count number is equal to the set value, signals for the scan clutch $CL_1$ OFF and return clutch $CL_2$ ON mentioned earlier are emitted at the step ⑫. Since the circuit itself for turning ON or OFF the clutches by signals as desired is conventional, detailed description is abbreviated here for brevity, but connection is made from the interface (I/O) 210 to the clutch actuating circuit through a suitable switching circuit. The termination of the returning of the scanning system started for the returning is effected by the processing at step ⑬.

In the step ⑫ the signals for the scanning stopping and starting of the returning are emitted as described earlier, and simultaneously, the contents of the random access memory (RAM) 208 are cleared for the subsequent copying operation, with the pulse number count flag being reset to "$\phi$".

In a step ⑭ the processing goes back to the step 1 after receipt of the synchronizing pulse of the reference timer (T) for pulse interval adjustment. The above synchronizing pulse is to prevent, for example, the inconvenience that the time control by the reference timer (T) is not synchronized with the function of the driving system due to variation of the rotating speed of the motor M by application of mechanical pulse input through the interface (I/O) 210.

Figure 5:
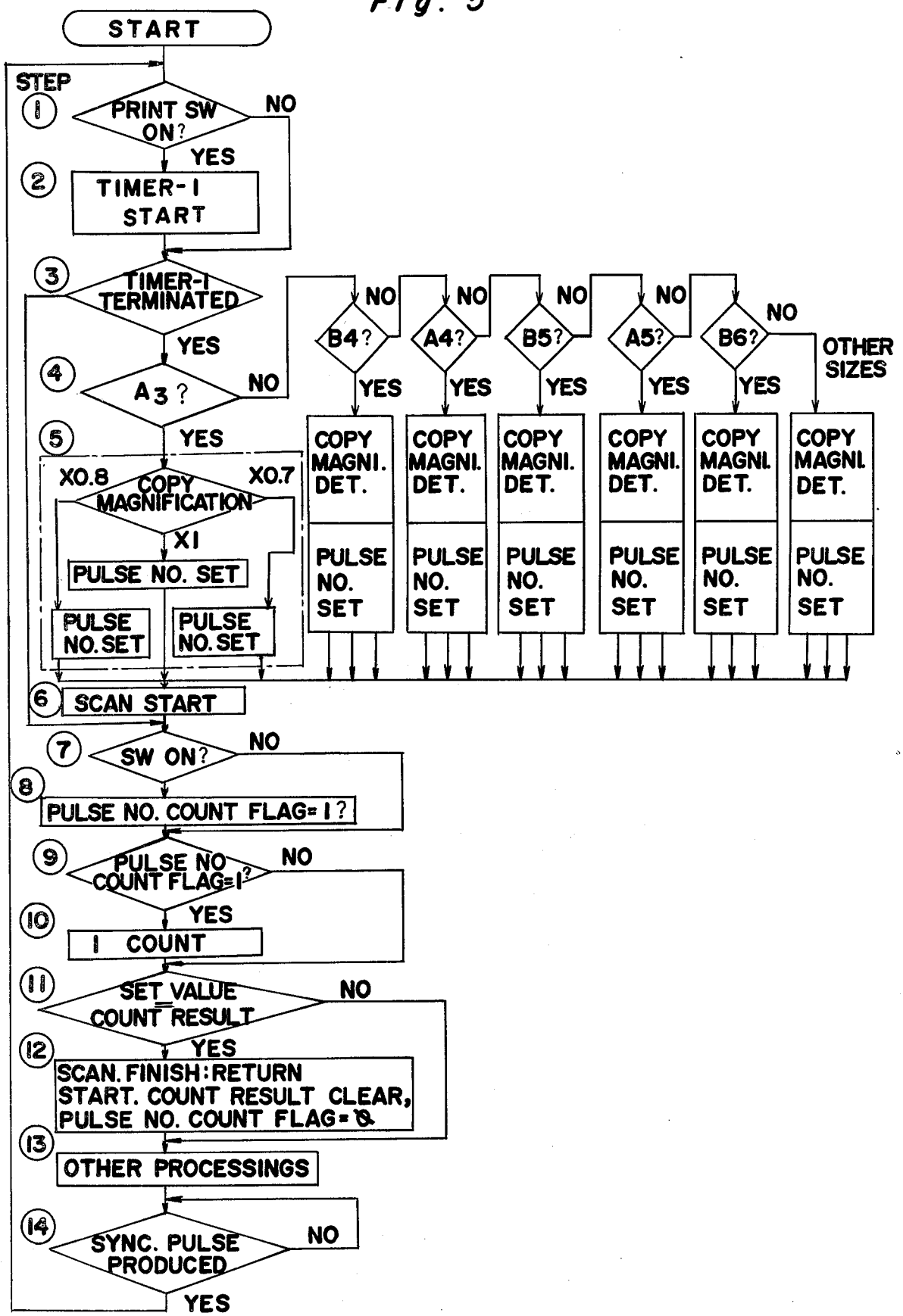
FIG. 5 is a flow-chart explanatory of sequence of operations of the scanning system control device according to the present invention.

In the foregoing description of the functioning to be effected during one pulse of the reference timer (T) in the control by the micro-computer MC, in functioning for one routine processing, it takes two seconds for scanning A3 size and one second for scanning A5 size, for example, in the equal magnification copying, and on the assumption that the designated value for the pulse interval of the above synchronizing pulse is 10 msec., when A3 size is judged at the step ④ of the flow-chart of FIG. 5, the set value in the program is preliminarily set, for example, 200 for A3 size and 100 for A5 size, and when the above function is respectively carried out by 200 times and 100 times upon turning ON of the switch $SW_1$ after starting of the scanning, the judgement for "YES" is made at the step ⑪ to stop the scanning system. It is to be noted that although the moving speed of the scanning system, etc. varies upon variation of the speed of the motor M of the driving system, such erroneous component is absorbed since the above synchronizing pulse varies to correspond to the driving speed, thus no alteration being required for the set number.

On the other hand, when the copying magnification is set to be higher than the equal size magnification and detected as such, the set number at the step ⑤ varies accordingly and as described earlier, the number to be set is equivalent to the time required for the scanning system moving at a speed corresponding to the copying magnification, to scan the area available for the copying. Therefore, even in the case where a combination of the copy paper size and copying magnification by which the area available for the copying becomes larger than that of the original platform ⑩ is selected, no value that will exceed the size of the original platform ⑩ is to be set.

Although the means for copy paper size detection and judgement employed for the present invention may be modified into various ways, one example of these means is described hereinbelow with reference to FIGS. 6(a) to 7.

Figure 6A:
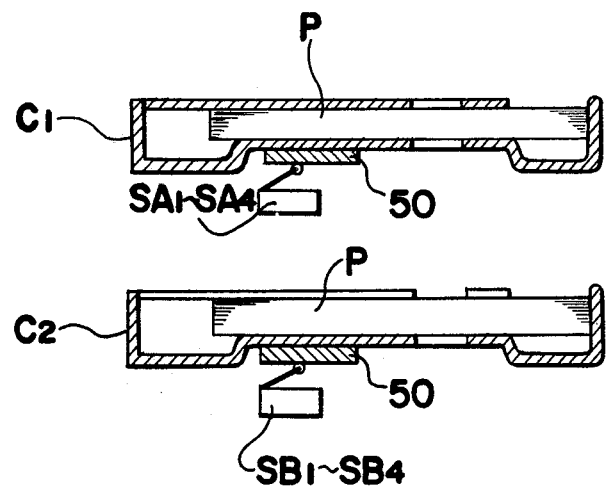
FIG. 6(a) is a side sectional view showing, on an enlarged scale, the mechanism for judging copy paper sheet size employed in the copying apparatus of FIG. 1.
Figure 6B:
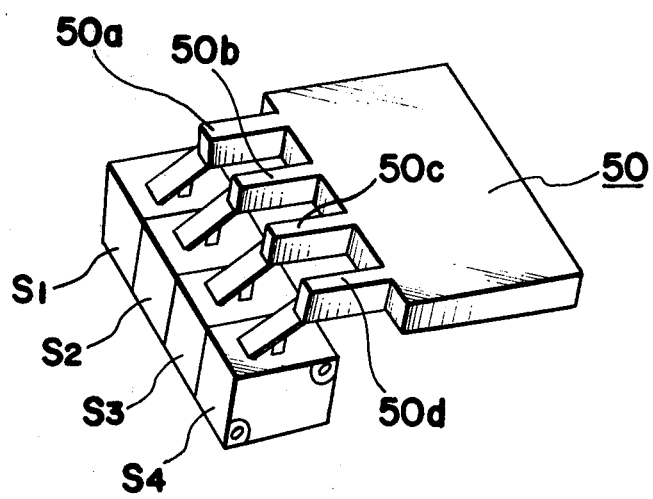
FIG. 6(b) is a perspective view showing, on a still enlarged scale, the construction of a code member employed in the mechanism of FIG. 6(a)

As shown in FIGS. 6(a) and 6(b), each of the cassettes $C_1$ and $C_2$ is provided with a code member or actuator member 50 secured to or integrally formed with the bottom portion thereof. The code member 50 has projections, for example, four projections 50a, 50b, 50c and 50d laterally extending therefrom, and respectively arranged to contact corresponding switches for copy paper size detection provided on the side of the apparatus housing Ga when the cassette $C_1$ or $C_2$ is loaded. The number of the projections may be reduced by suitably cutting off those not required. By way of example, if all of the four projections 50a to 50d contact the corresponding switches $S_1$ to $S_4$ to emit the signal for (1111), sixteen judgements become possible including ($\phi\phi\phi\phi$), and if the codes are determined for each copy paper size, the size judgement is automatically effected upon loading of the cassettes $C_1$ and $C_2$.

Figure 7:
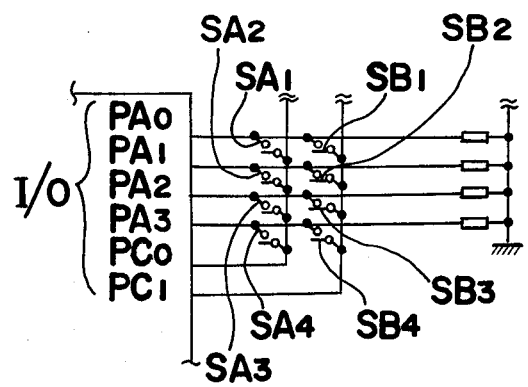
FIG. 7 is a schematic diagram showing the connection of the mechanism of FIG. 6(a) with the micro-computer of FIG. 3.

Referring also to FIG. 7 showing the input and output relation between the switches $S_1$ to $S_4$ and the interface (I/O) 210 of the micro-computer MC, it is assumed that the size detection is to be effected for the upper and lower cassettes $C_1$ and $C_2$ as shown in FIG. 6(a), with the detection switches for the upper cassette $C_1$ being designated as $SA_1$, $SA_2$, $SA_3$ and $SA_4$ and those for the lower cassettes $C_2$ as $SB_1$, $SB_2$, $SB_3$ and $SB_4$.

Detection signals are emitted from the output ports $PC_\phi$ and $PC_1$ of the interface (I/O) at respectively different timings, and the output from the output port $PC_\phi$ is connected to respective input ports $PA_\phi$, $PA_1$, $PA_2$ and $PA_3$ through the corresponding switches $SA_1$, $SA_2$, $SA_3$ and $SA_4$, while the output from the output port $PC_1$ is connected to respective input ports $PA_\phi$, $PA_1$, $PA_2$ and $PA_3$ through the corresponding switches $SB_1$, $SB_2$, $SB_3$ and $SB_4$, and thus, during output period of the respective output ports $PC_\phi$ and $PC_1$, the size judgement is effected by binary code of four bits through combination of opening and closing of the size judging switches $SA_1$ to $SA_4$ and $SB_1$ to $SB_4$.

It should be noted that, for the size judging means according to each of the copy paper sheet cassettes, various modifications, for example, means for converting optically detectable markings printed on the cassettes in white, black, etc. into electrical signals by an photoelectric transducer element, means composed of combination of magnet and lead switch, etc. are considered to be employed. Moreover, it may be so arranged that, in the absence of copy paper sheets in the cassettes loaded in the copying apparatus, the signal for $\phi\phi\phi\phi$ is emitted, by providing, apart from the copy paper size detection means mentioned above, means for detecting presence of the copy paper sheets including, for example, light transmitting opening formed at a predetermined position of the cassette together with light emitting and light receiving elements.

Figure 8:
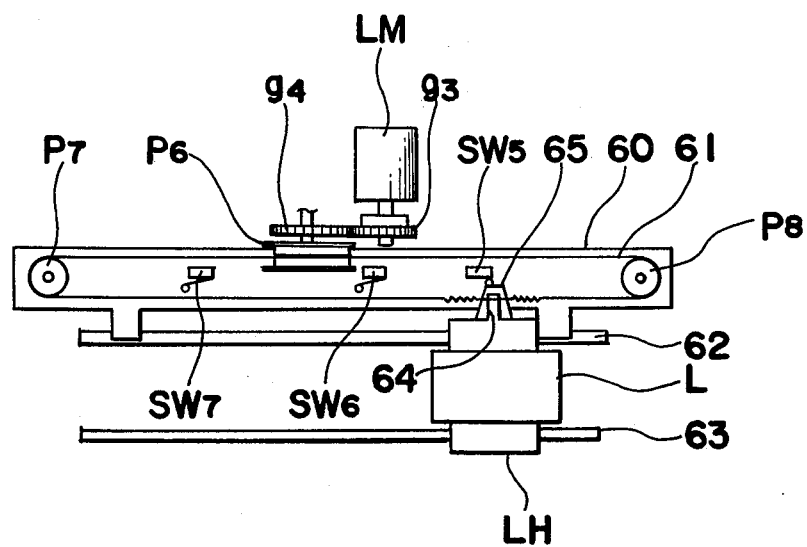
FIG. 8 is a schematic side sectional view showing, on an enlarged scale, one example of the structure of lens assembly moving means and copying magnification detecting means which may be incorporated in the arrangement of FIG. 1.

Referring to FIG. 8, the copying magnification detection means is so arranged as to obtain the predetermined signals through detection of displacement of the lens assembly L following alteration of the magnifications. More specifically, simultaneously with the change-over of the driving speeds for the exposure lamp l, reflecting mirrors m1 and m2, etc. following suitable magnification change-over operation as described earlier, the lens assembly L is also moved to a predetermined position, at which time, the position of the lens assembly L is detected through microswitches $SW_5$, $SW_6$ and $SW_7$ to be actuated as the lens assembly L is moved, and the signals obtained by the above detection are converted into predetermined magnification signals so as to be input to the random access memory (RAM) 208 through the interface (I/O) 210 mentioned earlier.

In the driving mechanism for the lens assembly L shown in FIG. 8, the driving force of a motor LM is transmitted to a pulley $P_6$ through gears g3 and g4 meshing with each other for moving a lens holder LH through movement of a lens assembly moving wire 61 passed around the pulley $P_6$, and pulleys $P_7$ and $P_8$ rotatably provided adjacent to opposite ends of a base 60. The lens holder LH is slidably mounted on rails 62 and 63, while opposite ends of the wire 61 are connected to a projection or pin 64 integrally formed or rigidly secured to the lens holder LH. The lens holder LH is further provided with a switch actuating portion 65 so as to contact actuators of the microswitches $SW_5$, $SW_6$ and $SW_7$ arranged at predetermined positions on the base 60 for actuating predetermined ones of the microswitches $SW_5$ to $SW_7$ to emit lens assembly stopping signal and also signal corresponding to each of the copying magnifications.

The microswitches $SW_5$ to $SW_7$ are respectively disposed at the predetermined positions corresponding to the equal size magnification, contraction A and contraction B, which positions are optically determined based on the locations of the lens assembly L according to the copying magnifications. It is to be noted that the contraction A means reduction to ½, and contraction B refers to contraction of 0.816 through change-over of A row and B row.

Although not particularly shown in the drawings, the copying magnification signal produced by the functioning of the respective microswitches SW$_5$ to SW$_7$ are formed into codes for each copying magnification through a suitable signal converting means (not shown) so as to be input to the random access memory (RAM) 208 mentioned earlier.

It is to be noted here that, since some change-over operation is effected during the selection of the copying magnifications to be made by the operator, the signal obtained in the above case may be directly utilized as copying magnification detection signal.

As is clear from the foregoing description, according to the present invention, since the copying apparatus is equipped with the scanning system control device including means for judging the sizes of the copy paper sheets employed, means for detecting the copying magnifications, and means for controlling the movement of the scanning system of the copying apparatus so as to correspond to the area available for copying to be determined by the judged size and detected copying magnification, the movement of the scanning system is not controlled by the size of the original or copy paper sheet itself, but is regulated to correspond to the area available for the copying on the original platform to be determined by the copy paper size and copying magnification. The above arrangement is not only extremely rational as described in the foregoing, but is very advantageous to practical use, since controls for a variety of copy paper sizes and copying magnifications are automatically judged and determined without imposing any troublesome procedures on the part of operators.

Furthermore, if digital control devices such as microcomputer and the like are employed for the control as described above, various timer setting corresponding to the copy paper sizes and copying magnifications can be effected extremely accurately to achieve the control without complicating the control circuit. Moreover, if the pulse interval of the reference timer of the above digital control device is arranged to be variable corresponding to the speed of the driving system of the copying apparatus, accurate synchronization between the electrical pulse control and driving system can be achieved for precise control.

It is to be noted here that, the foregoing embodiment is mainly described with reference to one example of the digital control device utilizing the micro-computer for effecting the program as shown in the flow-chart of FIG. 5, but the concept of the present invention is not limited in its application to the scanning system employing the micro-computer alone, and that the flow chart, i.e. program is not restricted to that shown in FIG. 5 but may be modified in various ways, although the use of the micro-computer is advantageous as described in the foregoing. For example, the arrangement of the foregoing embodiment may be so modified as to once set the number of pulses at the equal size magnification according to the judgement of the copy paper size for subsequently determining the number of pulses during the varied magnification by multiplying a predetermined factor depending on the copying magnification. In this case also, it is necessary to preliminarily determine the maximum time width to avoid such time setting that the scanning system moves beyond the length of the original platform 10 by the number of pulses worked out.

It should also be noted that, although the utilization of the count by the control pulse for the time setting is advantageous in that it is accurate and a variety of time settings are readily effected, the present invention intends to control the scanning system corresponding to the area available for copying to be determined by the copy paper size and copying magnification employed, and that the arrangement of the present invention is not limited specially to the pulse count control alone, but may be applied to other types of controls, so far as the intention of the present invention is achieved.

Although the present invention has been fully described by way of example with reference to the attached drawings, it is to be noted that various changes and modifications are apparent to those skilled in the art. Therefore unless otherwise such changes and modifications depart from the scope of the present invention, they should be construed as included therein.

What is claimed is:

1. An electrophotographic copying apparatus which comprises an original platform of transparent plate material, an optical system having a light source for illuminating an original to be copied from under surface of said original platform and reflecting mirrors and lens assembly for directing light-wise image of the original illuminated by said light source onto a photoreceptor, means for scanning the original including means for relatively moving said optical system and said original platform, means for selecting copying magnifications at least including mechanism for varying moving speed of said original scanning means, copy paper loading section capable of loading thereon copy paper of at least more than two different sizes, and control device for controlling scanning movement at least of said original scanning means, said control device further comprising:
    (a) means for detecting the copying magnification selected by said copying magnification selecting means;
    (b) means for detecting size of the copy paper loaded on said copy paper loading section;
    (c) means for setting time required for said scanning means to move over area available for the copying at the moving speed to be determined by said copying magnification, so as to correspond to the area available for the copying on said original platform to be determined by the detected magnification and copy paper size;
    (d) means for starting the scanning movement of said scanning means at predetermined speed to be determined by said copying magnification;
    (e) means for measuring time started to function following starting of the scanning of said scanning means,
    (f) means for comparing the time measured by said time measuring means with the time preliminarily set by said time setting means, and
    (g) means for emitting signal to stop the scanning movement of said scanning means when said measured time becomes equal to said set time as a result of the comparison by said comparing means.

2. An electrophotographic copying apparatus as claimed in claim 1, wherein said time measuring means is a timer means disposed on the way of movement of said scanning means so as to be actuated for functioning following starting of the movement of said scanning means.

3. An electrophotographic copying apparatus as claimed in claim 1, wherein said control device is a digital control device having program function and said time measuring means is a counter counting pulse signals having reference time width, said time setting means being means for setting the number of said pulse signals.

4. An electrphotographic copying apparatus as claimed in claim 3, wherein said digital device is a micro-computer including random access memory and read only memory, said random access memory judging, by values set in said time setting means, the contents of said random access memory to which signals from said magnification detecting means and said size detecting means are applied, said read only memory being preliminarily set to predetermined program in said read only memory selected on the basis of said judgement.

5. An electrophotographic copying apparatus as claimed in claim 1, wherein said copy paper size detecting means further includes cassette member accommodating therein copy paper sheets, codes each corresponding to a particular one of the copy paper sizes, and means for detecting said codes provided on an apparatus housing of said copying apparatus, said code detecting means being associated with said time setting means.

6. An electrophotographic copying apparatus as claimed in claim 1, wherein said copying magnification selecting means further includes means for moving said lens assembly, said copying magnification detecting means including switching means for detecting position of movement of said lens assembly.

* * * * *